US012649274B2

(12) United States Patent
Noronha et al.

(10) Patent No.: US 12,649,274 B2
(45) Date of Patent: Jun. 9, 2026

(54) PICK AND PLACE END EFFECTOR CONFIGURED TO FORM A KINK

(71) Applicant: The Boeing Company, Arlington, VA (US)

(72) Inventors: Colin Noronha, Burien, WA (US); Jonathan Young Ahn, Seattle, WA (US); Christopher Robert Brown, Seattle, WA (US); Ricardo Andreas Fritzke, Sammamish, WA (US); Brian Gregory Robins, Renton, WA (US); Kurtis Shuldberg Willden, Kent, WA (US); Elizaveta Leonardovna Manevich, Auburn, WA (US)

(73) Assignee: The Boeing Company, Arlington, VA (US)

( * ) Notice: Subject to any disclaimer, the term of this patent is extended or adjusted under 35 U.S.C. 154(b) by 13 days.

(21) Appl. No.: 18/678,946

(22) Filed: May 30, 2024

(65) Prior Publication Data

US 2025/0121553 A1     Apr. 17, 2025

Related U.S. Application Data

(60) Provisional application No. 63/590,262, filed on Oct. 13, 2023.

(51) Int. Cl.
B29C 53/08     (2006.01)
B29C 53/82     (2006.01)
B29L 31/30     (2006.01)

(52) U.S. Cl.
CPC ............ B29C 53/083 (2013.01); B29C 53/82 (2013.01); *B29L 2031/3076* (2013.01)

(58) Field of Classification Search
CPC ......... B29C 43/36; B29C 70/00; B23Q 3/062; B23Q 3/088
See application file for complete search history.

(56) References Cited

U.S. PATENT DOCUMENTS

| | | | | |
|---|---|---|---|---|
| 3,992,240 | A | * 11/1976 | Kuehn, Jr. ............ | B29C 70/525 156/263 |
| 10,919,237 | B2 | * 2/2021 | Stone ................... | B25J 15/0616 |
| 2014/0182479 | A1 | * 7/2014 | Hafenrichter ............ | B64F 5/60 105/30 |

(Continued)

OTHER PUBLICATIONS

Extended European Search Report, dated Jan. 14, 2025, regarding EP Application No. 24190583.5, 8 pages.

(Continued)

*Primary Examiner* — Andrew D Graham
(74) *Attorney, Agent, or Firm* — Yee & Associates, P.C.

(57)     ABSTRACT

A pick and place end effector configured to form a kink in a composite laminate. The pick and place end effector comprises a vacuum lift face configured to hold the composite laminate and move from a flat configuration to a forming configuration with an angle in the vacuum lift face to form the kink in the composite laminate; a number of motors configured to move the vacuum lift face between the flat configuration and the forming configuration; and a number of restraints configured to clamp portions of a composite laminate on opposite sides of the kink on the vacuum lift face during movement between the flat configuration and the forming configuration.

22 Claims, 13 Drawing Sheets

(56) References Cited

U.S. PATENT DOCUMENTS

| | | | |
|---|---|---|---|
| 2014/0237793 A1* | 8/2014 | Gamboa | F16B 47/00 |
| | | | 403/33 |
| 2014/0250675 A1* | 9/2014 | Sherrill | B23Q 3/063 |
| | | | 269/21 |
| 2016/0052145 A1* | 2/2016 | Spicer | B23Q 3/1543 |
| | | | 269/8 |
| 2016/0243702 A1* | 8/2016 | Crothers | B25J 9/1612 |
| 2016/0332272 A1* | 11/2016 | Visnoski | B23Q 3/062 |
| 2017/0225804 A1* | 8/2017 | Hafenrichter | B64F 5/60 |
| 2019/0070772 A1 | 3/2019 | Stone | |
| 2019/0184693 A1* | 6/2019 | Johnson | B29C 70/38 |
| 2020/0130294 A1* | 4/2020 | Halbritter | B29C 70/44 |
| 2021/0354403 A1* | 11/2021 | Jones | B29C 53/42 |
| 2021/0379845 A1* | 12/2021 | Abou-Assali Rodríguez | |
| | | | B29C 70/38 |
| 2022/0176650 A1* | 6/2022 | Ly | B29C 31/08 |
| 2022/0212421 A1* | 7/2022 | Parkinson | B29C 70/542 |
| 2022/0242064 A1* | 8/2022 | Suriyaarachchi | B29C 70/38 |
| 2022/0371292 A1* | 11/2022 | Petersen | B29C 31/085 |

OTHER PUBLICATIONS

European Patent Office Action, dated Nov. 5, 2025, regarding EP Application No. 24190583.5.

* cited by examiner

TO FIG. 2B

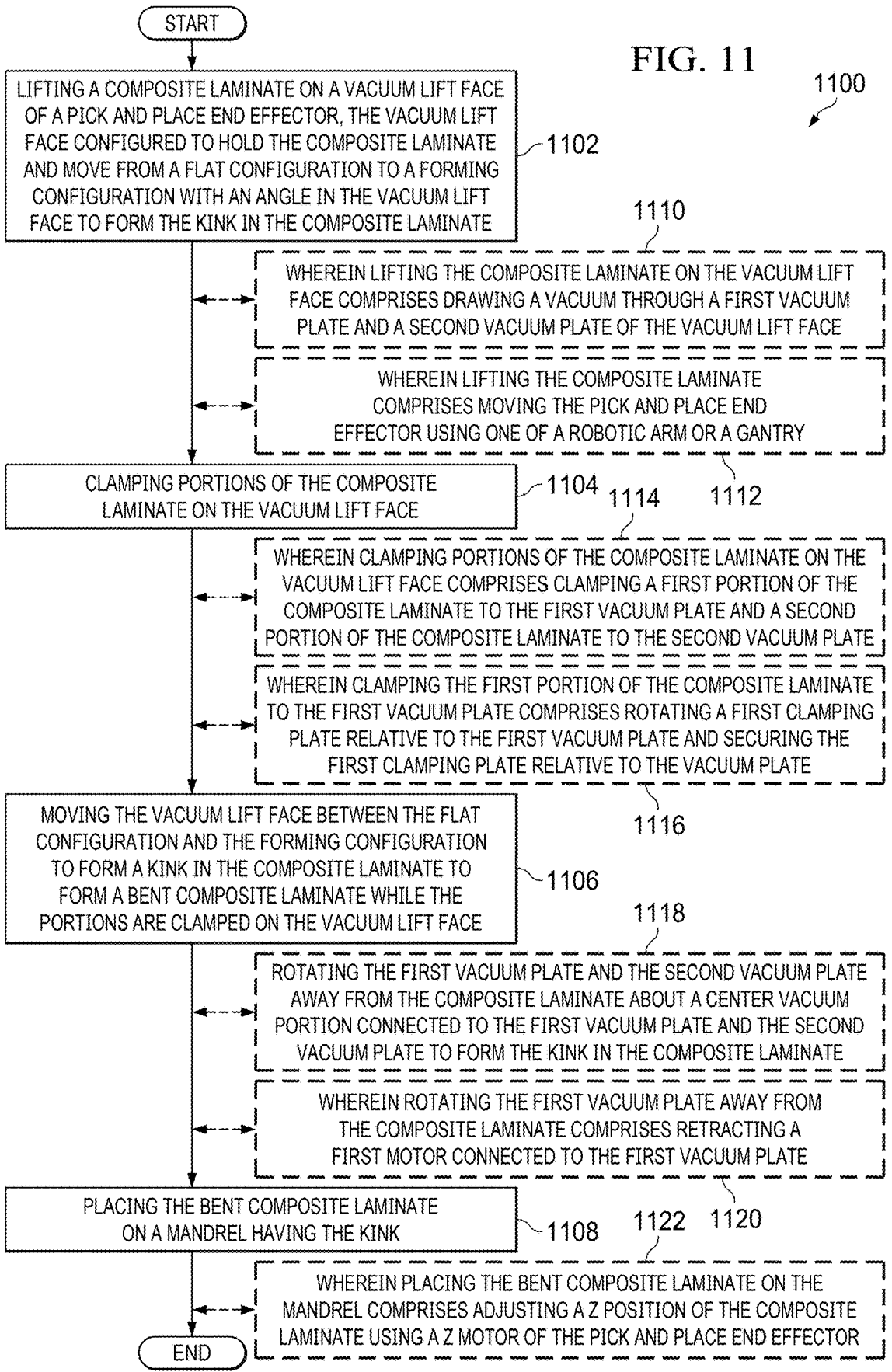

START

LIFTING A COMPOSITE LAMINATE ON A VACUUM LIFT FACE OF A PICK AND PLACE END EFFECTOR, THE VACUUM LIFT FACE CONFIGURED TO HOLD THE COMPOSITE LAMINATE AND MOVE FROM A FLAT CONFIGURATION TO A FORMING CONFIGURATION WITH AN ANGLE IN THE VACUUM LIFT FACE TO FORM THE KINK IN THE COMPOSITE LAMINATE ⌐1102

1110

WHEREIN LIFTING THE COMPOSITE LAMINATE ON THE VACUUM LIFT FACE COMPRISES DRAWING A VACUUM THROUGH A FIRST VACUUM PLATE AND A SECOND VACUUM PLATE OF THE VACUUM LIFT FACE

WHEREIN LIFTING THE COMPOSITE LAMINATE COMPRISES MOVING THE PICK AND PLACE END EFFECTOR USING ONE OF A ROBOTIC ARM OR A GANTRY

CLAMPING PORTIONS OF THE COMPOSITE LAMINATE ON THE VACUUM LIFT FACE ⌐1104   1114       1112

WHEREIN CLAMPING PORTIONS OF THE COMPOSITE LAMINATE ON THE VACUUM LIFT FACE COMPRISES CLAMPING A FIRST PORTION OF THE COMPOSITE LAMINATE TO THE FIRST VACUUM PLATE AND A SECOND PORTION OF THE COMPOSITE LAMINATE TO THE SECOND VACUUM PLATE

WHEREIN CLAMPING THE FIRST PORTION OF THE COMPOSITE LAMINATE TO THE FIRST VACUUM PLATE COMPRISES ROTATING A FIRST CLAMPING PLATE RELATIVE TO THE FIRST VACUUM PLATE AND SECURING THE FIRST CLAMPING PLATE RELATIVE TO THE VACUUM PLATE

MOVING THE VACUUM LIFT FACE BETWEEN THE FLAT CONFIGURATION AND THE FORMING CONFIGURATION TO FORM A KINK IN THE COMPOSITE LAMINATE TO FORM A BENT COMPOSITE LAMINATE WHILE THE PORTIONS ARE CLAMPED ON THE VACUUM LIFT FACE    1116

⌐1106

1118

ROTATING THE FIRST VACUUM PLATE AND THE SECOND VACUUM PLATE AWAY FROM THE COMPOSITE LAMINATE ABOUT A CENTER VACUUM PORTION CONNECTED TO THE FIRST VACUUM PLATE AND THE SECOND VACUUM PLATE TO FORM THE KINK IN THE COMPOSITE LAMINATE

WHEREIN ROTATING THE FIRST VACUUM PLATE AWAY FROM THE COMPOSITE LAMINATE COMPRISES RETRACTING A FIRST MOTOR CONNECTED TO THE FIRST VACUUM PLATE

PLACING THE BENT COMPOSITE LAMINATE ON A MANDREL HAVING THE KINK ⌐1108    1122   1120

WHEREIN PLACING THE BENT COMPOSITE LAMINATE ON THE MANDREL COMPRISES ADJUSTING A Z POSITION OF THE COMPOSITE LAMINATE USING A Z MOTOR OF THE PICK AND PLACE END EFFECTOR

END

1200

| 1202 | SPECIFICATION AND DESIGN |
| 1204 | MATERIAL PROCUREMENT |
| 1206 | COMPONENT AND SUBASSEMBLY MANUFACTURING |
| 1208 | SYSTEM INTEGRATION |
| 1210 | CERTIFICATION AND DELIVERY |
| 1212 | IN SERVICE |
| 1214 | MAINTENANCE AND SERVICE |

1300

AIRCRAFT

1302 AIRFRAME     INTERIOR 1306

SYSTEMS

PROPULSION SYSTEM     ELECTRICAL SYSTEM 1308   1312     1310   1314

HYDRAULIC SYSTEM     ENVIRONMENTAL SYSTEM

1304

PICK AND PLACE END EFFECTOR CONFIGURED TO FORM A KINK

CROSS-REFERENCE TO RELATED APPLICATION

This application claims the benefit of U.S. Provisional Patent Application Ser. No. 63/590,262, filed Oct. 13, 2023, and entitled "Pick and Place End Effector Configured to Form a Kink," which is incorporated herein by reference in its entirety.

BACKGROUND INFORMATION

1. Field

The present disclosure relates generally to composite manufacturing and more specifically to forming a kink in a composite laminate during a pick and place operation.

2. Background

Composite materials are strong, light-weight materials created by combining two or more functional components. For example, a composite material may include reinforcing fibers bound in polymer resin matrix. The fibers can take the form of a unidirectional tape, woven cloth or fabric, or a braid. The mechanical properties and other material properties of composite materials can be desirable for some implementations.

Composite manufacturing uses different methods than metal processing due to the different material characteristics. Some composite manufacturing is performed by hand due to complex shapes, especially shapes with bends or kinks. However, it is undesirably time consuming to form composite structures by hand.

Therefore, it would be desirable to have a method and apparatus that takes into account at least some of the issues discussed above, as well as other possible issues. It would be desirable to have an automated method of forming a composite structure with a kink.

SUMMARY

An embodiment of the present disclosure provides a pick and place end effector configured to form a kink in a composite laminate. The pick and place end effector comprises a vacuum lift face configured to hold the composite laminate and move from a flat configuration to a forming configuration with an angle in the vacuum lift face to form the kink in the composite laminate, a number of motors configured to move the vacuum lift face between the flat configuration and the forming configuration, and a number of restraints configured to clamp portions of a composite laminate on opposite sides of the kink on the vacuum lift face during movement between the flat configuration and the forming configuration.

Another embodiment of the present disclosure provides a method of forming a kink into a composite laminate. A composite laminate is lifted on a vacuum lift face of a pick and place machine, the vacuum lift face configured to hold the composite laminate and move from a flat configuration to a forming configuration with an angle in the vacuum lift face to form the kink in the composite laminate. Portions of the composite laminate are clamped on the vacuum lift face. The vacuum lift face is moved between the flat configuration and the forming configuration to form a kink in the composite laminate to form a bent composite laminate while the portions are clamped on the vacuum lift face. The bent composite laminate is placed on a mandrel having the kink.

Yet another embodiment of the present disclosure provides a pick and place end effector configured to form a kink. The pick and place end effector comprises a vacuum lift face, a stationary center vacuum portion, a first vacuum plate movably connected to the stationary center vacuum portion, and a second vacuum plate movably connected to the stationary center vacuum portion; a number of restraints configured to restrain movement of portions of a composite laminate on opposite sides of the stationary center vacuum portion on the vacuum lift face; and a number of motors configured to move the first vacuum plate and the second vacuum plate relative to the stationary center vacuum portion to place the vacuum lift face in a forming configuration having an angle.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is a flowchart of a method of forming a kink into a composite laminate in accordance with an illustrative embodiment;

DETAILED DESCRIPTION

The illustrative examples recognize and take into account one or more considerations. The illustrative examples recognize and take into account that a kink is present in rear wing spars for aerospace structure and drag reduction. The illustrative examples recognize and take into account that the kink poses manufacturing challenges for composite fabrication. The illustrative examples recognize and take into account that a spar can be manufactured in three or more components.

The illustrative examples allow green spar charges to be kinked, as well as picked and placed without using manual labor. The illustrative examples maintain full tension throughout the part. The illustrative examples shift the neutral axis out of the part. As a result, the part is kept in tension and not compression during a bending operation.

Figure 1:
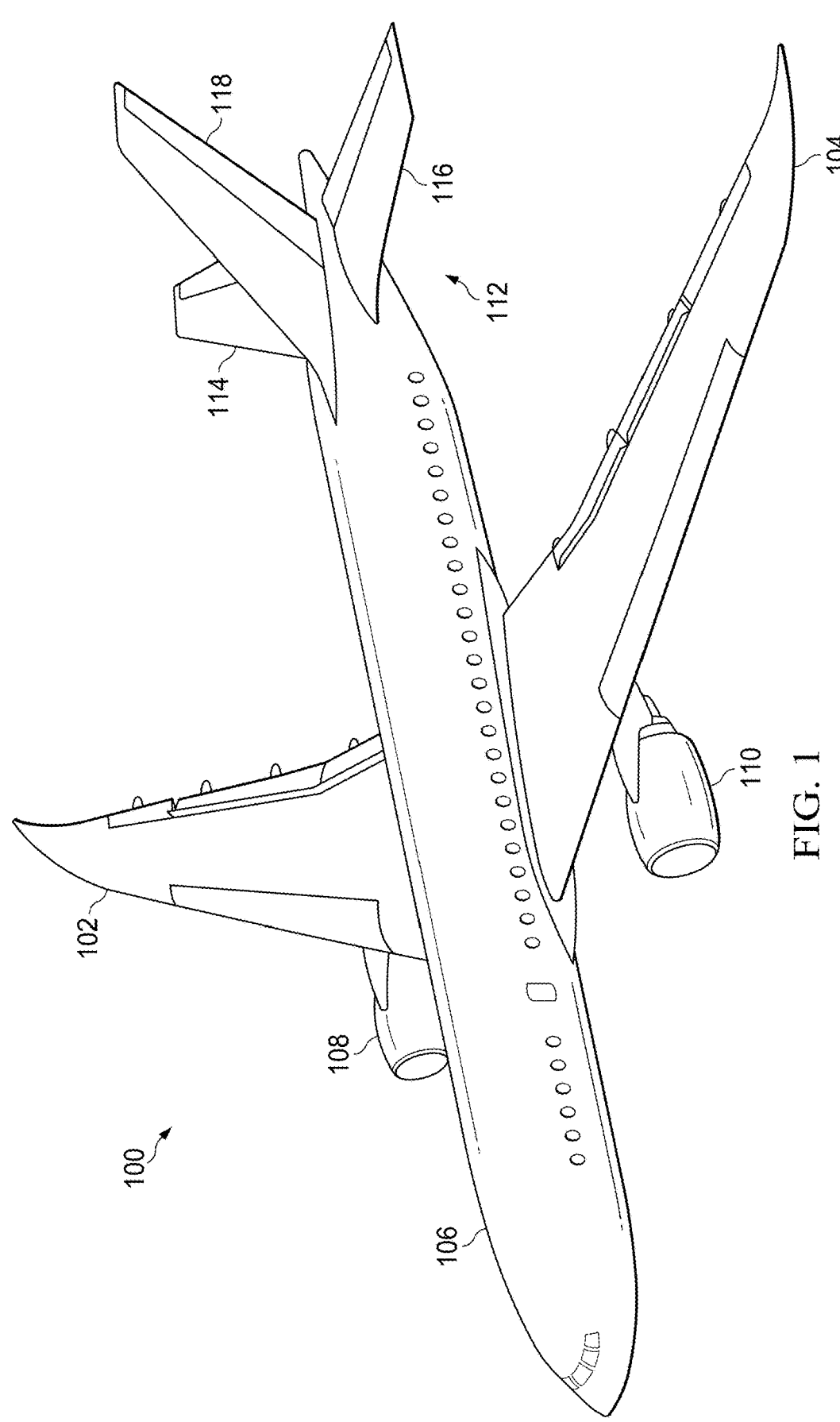
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have composite structures formed using the illustrative examples. For example, components of at least one of wing 102 or wing 104 can be formed using the illustrative examples. In some illustrative examples, spars of at least one of wing 102 or wing 104 can be formed using the illustrative examples.

Figure 2A:
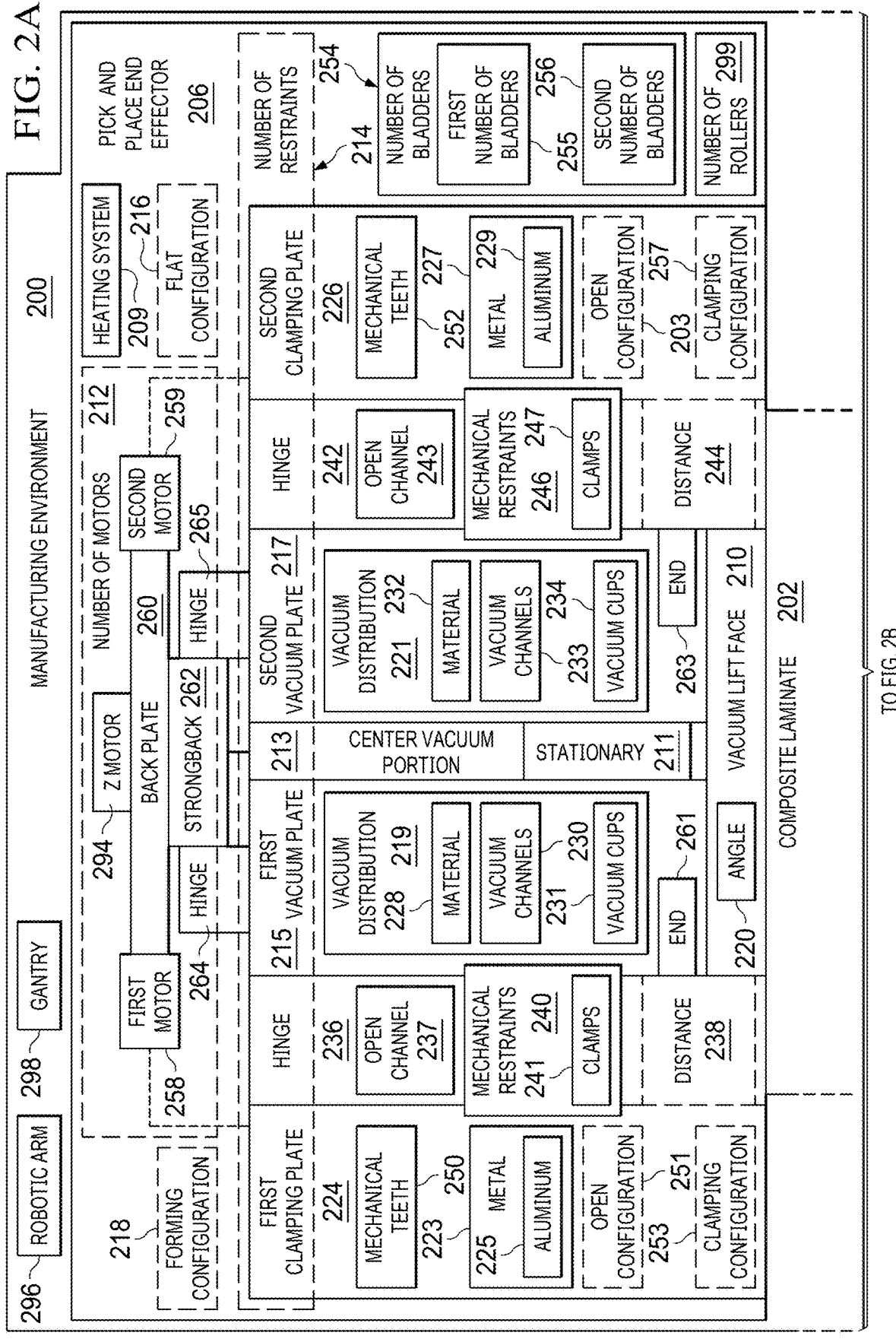
FIGS. 2A and 2B are an illustration of a block diagram of a manufacturing environment in accordance with an illustrative embodiment.
Figure 2B:
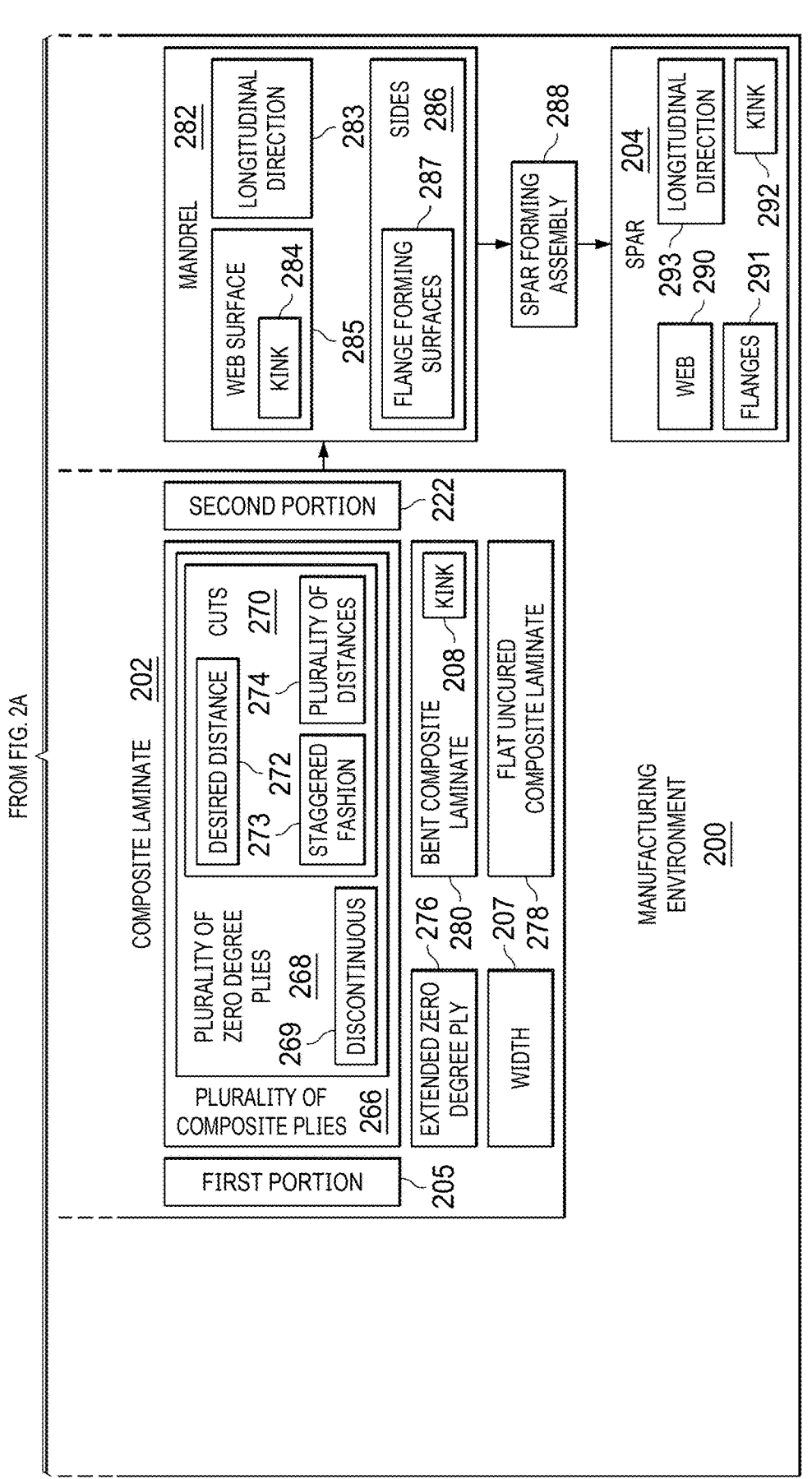

Turning now to FIGS. 2A and 2B, an illustration of a block diagram of a manufacturing environment is depicted in accordance with an illustrative embodiment. Manufacturing environment 200 is a composite manufacturing environment. In manufacturing environment 200, composite laminate 202 can be formed into spar 204. Pick and place end effector 206 is present in manufacturing environment 200 to lift and shape composite laminate 202.

Pick and place end effector 206 is configured to form kink 208 in composite laminate 202. Pick and place end effector 206 comprises vacuum lift face 210, number of motors 212, and number of restraints 214. Vacuum lift face 210 is configured to hold composite laminate 202 and move from flat configuration 216 to forming configuration 218 with angle 220 in vacuum lift face 210 to form kink 208 in composite laminate 202. Number of motors 212 is configured to move vacuum lift face 210 between flat configuration 216 and forming configuration 218.

Number of restraints 214 is configured to restrain movement of ends, first portion 205 and second portion 222 of composite laminate 202 on vacuum lift face 210. In some illustrative examples, number of restraints 214 is configured to clamp composite laminate 202 on vacuum lift face 210 during movement between flat configuration 216 and forming configuration 218. Number of restraints 214 is configured to clamp composite laminate 202 within a desired distance from where kink 208 will be formed in composite laminate 202. In some illustrative examples, composite laminate 202 is long compared to a size of kink 208. In some illustrative examples, number of restraints 214 is configured to clamp portions of composite laminate 202 on opposite sides of center vacuum portion 213 in vacuum lift face 210 during movement between flat configuration 216 and forming configuration 218. In some illustrative examples, number of restraints 214 is configured to clamp ends of composite laminate 202 on vacuum lift face 210 during movement between flat configuration 216 and forming configuration 218.

Number of restraints 214 is configured to clamp first portion 205 and second portion 222 of composite laminate 202 on vacuum lift face 210. In some illustrative examples, number of restraints 214 comprises first clamping plate 224 and second clamping plate 226. First clamping plate 224 is configured to clamp first portion 205 of composite laminate on vacuum lift face 210. First clamping plate 224 is configured to clamp full width 207 of composite laminate 202 against first vacuum plate 215 in clamping configuration 253. Second clamping plate 226 is configured to clamp second portion 222 of composite laminate 202 on vacuum lift face 210. Second clamping plate 226 is configured to clamp full width 207 of composite laminate 202 against second vacuum plate 217 in clamping configuration 257.

In some illustrative examples, first clamping plate 224 is formed of metal 223. In some illustrative examples, metal 223 takes the form of aluminum 225. In some illustrative examples, second clamping plate 226 is formed of metal 227. In some illustrative examples, metal 227 takes the form of aluminum 229.

Vacuum lift face 210 comprises stationary 211, center vacuum portion 213, first vacuum plate 215 movably connected to center vacuum portion 213, and second vacuum plate 217 movably connected to center vacuum portion 213 such that center vacuum portion 213 is between first vacuum plate 215 and second vacuum plate 217. First vacuum plate 215 has vacuum distribution 219 that provides vacuum to control lifting of composite laminate 202. Vacuum distribution 219 takes any desirable form. Vacuum distribution of vacuum lift face 210 comprises at least one of material of the vacuum lift face, vacuum channels, or vacuum cups.

In some illustrative examples, vacuum distribution 219 comprises material 228. Material 228 can be porous to distribute the vacuum. In some illustrative examples, vacuum distribution 219 comprises vacuum channels 230. Vacuum channels 230 can be formed into a material to direct vacuum in first vacuum plate 215. In some illustrative examples, vacuum distribution 219 comprises vacuum cups 231.

Second vacuum plate 217 has vacuum distribution 221 that provides vacuum to control lifting of composite laminate 202. Vacuum distribution 221 takes any desirable form. In some illustrative examples, vacuum distribution 219 and vacuum distribution 221 are the same. In some illustrative examples, vacuum distribution 219 and vacuum distribution 221 are different from each other.

In some illustrative examples, vacuum distribution 221 comprises material 232. Material 232 can be porous to distribute the vacuum. In some illustrative examples, vacuum distribution 221 comprises vacuum channels 233. Vacuum channels 233 can be formed into a material to direct vacuum in second vacuum plate 217. In some illustrative examples, vacuum distribution 221 comprises vacuum cups 234.

Vacuum supplied to vacuum lift face 210 is used for lifting of composite laminate 202. Controlling vacuum supplied to vacuum lift face 210 is used for the picking and placing operations of pick and place end effector 206. To provide for forming of kink 208 in composite laminate 202, number of restraints 214 provide a clamping force to composite laminate 202. Forming kink 208 in composite laminate 202 is performed while pick and place end effector 206 is holding composite laminate 202 and before placing composite laminate 202 on mandrel 282.

Number of restraints 214 is operated to provide tension in the composite laminate 202. The thickness of vacuum lift face 210 is such that, upon bending, the neutral axis of the combination of vacuum lift face 210 and the composite laminate 202 lies outside of composite laminate 202. The neutral axis of the combination of vacuum lift face 210 and the composite laminate 202 is near the interface of vacuum lift face 210 and composite laminate 202. The neutral axis being outside of composite laminate 202 puts the entirety of composite laminate 202 in tension and prevents or reduces the formation of wrinkles during formation of kink 208 in composite laminate 202. Vacuum is maintained between vacuum lift face 210 and composite laminate 202 to cause the combination of vacuum lift face 210 and composite laminate 202 to bend as one body.

In some illustrative examples, first clamping plate 224 is movably connected to first vacuum plate 215. As depicted, first clamping plate 224 is movably connected to first vacuum plate 215 by hinge 236. Hinge 236 has open channel 237 to control distance 238 between first clamping plate 224 and first vacuum plate 215. Open channel 237 is configured to set distance 238 between first clamping plate 224 and first vacuum plate 215. Distance 238 is variable based on a position of first clamping plate 224 in open channel 237 of hinge 236.

Mechanical restraints 240 are configured to hold first clamping plate 224 relative to vacuum lift face 210. In this illustrative example, mechanical restraints 240 comprises clamps 241. Mechanical restraints 240 include any desirable restraints to maintain a desired value for distance 238 and a desired compression.

In some illustrative examples, second clamping plate 226 is movably connected to second vacuum plate 217. As depicted, second clamping plate 226 is movably connected to second vacuum plate 217 by hinge 242. Hinge 242 has open channel 243 to control distance 244 between second clamping plate 226 and second vacuum plate 217. Distance 244 is variable based on a position of second clamping plate 226 in open channel 243 of hinge 242.

Mechanical restraints 246 are configured to hold second clamping plate 226 relative to vacuum lift face 210. In this illustrative example, mechanical restraints 246 comprise clamps 247. Mechanical restraints 246 include any desirable restraints to maintain a desired value for distance 244 and a desired compression.

First clamping plate 224 and second clamping plate 226 each comprise gripping teeth configured to grip composite laminate 202. In some illustrative examples, first clamping plate 224 comprises mechanical teeth 250 configured to prevent or reduce slippage of composite laminate 202 relative to first clamping plate 224. In some illustrative examples, mechanical teeth 250 are referred to as gripping teeth. In some illustrative examples, second clamping plate 226 comprises mechanical teeth 252 configured to prevent or reduce slippage of composite laminate 202 relative to second clamping plate 226.

First clamping plate 224 is configured to move between open configuration 251 and clamping configuration 253. In open configuration 251, first vacuum plate 215 is not obscured by first clamping plate 224. In clamping configuration 253, first clamping plate 224 is restrained at distance 238 relative to first vacuum plate 215. Distance 238 is variable when open channel 237 is present in hinge 236. In some illustrative examples, first clamping plate 224 is connected to first motor 258 when in open configuration 251. First clamping plate 224 is secured using mechanical restraints 240 in clamping configuration 253.

Number of motors 212 is configured to move first vacuum plate 215 and second vacuum plate 217 relative to stationary 211 center vacuum portion 213 to place vacuum lift face 210 in forming configuration 218 having angle 220. Number of motors 212 comprises first motor 258 connected to first vacuum plate 215 at end 261 opposite center vacuum portion 213 and second motor 259 connected to second vacuum plate 217 at end 263 opposite center vacuum portion 213. An electronic motor can provide a desired level of accuracy without additional metrology. In some illustrative examples, first motor 258 comprises an electronic motor. In some illustrative examples, second motor 259 comprises an electronic motor. In some illustrative examples, number of motors 212 comprises a first electronic motor connected to first clamping plate 224 and a second electronic motor connected to second clamping plate 226.

Pick and place end effector 206 further comprises back plate 260 connecting first motor 258 and second motor 259. Pick and place end effector 206 further comprises strongback 262 connecting center vacuum portion 213 to back plate 260.

As depicted, first vacuum plate 215 is connected to strongback 262 by hinge 264. Hinge 264 allows for controlled movement of first vacuum plate 215 relative to center vacuum portion 213. In some illustrative examples, hinge 264 can limit an extent of movement by first vacuum plate 215 relative to center vacuum portion 213.

As depicted, second vacuum plate 217 is connected to strongback 262 by hinge 265. Hinge 265 allows for controlled movement of second vacuum plate 217 relative to center vacuum portion 213. In some illustrative examples, hinge 265 can limit an extent of movement by second vacuum plate 217 relative to center vacuum portion 213.

Z motor 294 is connected to other components of pick and place end effector 206 such that Z motor 294 can make adjustments in positioning of vacuum lift face 210 independent of robotic arm 296 and gantry 298. Z motor 294 is configured to move components of pick and place end effector 206 in a Z direction with a desired amount of accuracy. Z motor 294 is configured to move first vacuum plate 215 and second vacuum plate 217 in a Z direction independent of robotic arm 296 and gantry 298.

Pick and place end effector 206 is connected to one of robotic arm 296, gantry 298, or any other desirable large scale movement system. Pick and place end effector 206 lifts composite laminate 202 from a flat layup tool. When lifted, composite laminate 202 takes the form of flat uncured composite laminate 278. Composite laminate 202 comprises plurality of composite plies 266. Plurality of composite plies 266 includes plurality of zero degree plies 268. Plurality of zero degree plies 268 comprises cuts 270 causing plurality of zero degree plies 268 to be discontinuous 269. Plurality of zero degree plies 268 comprises cuts 270 in a widthwise direction such that plurality of zero degree plies 268 is discontinuous 269 in a longitudinal direction. Plurality of zero degree plies 268 is discontinuous 269 extending across vacuum lift face 210 in a direction going from first vacuum plate 215 towards second vacuum plate 217.

Cuts 270 are present in plurality of zero degree plies 268 to reduce or prevent wrinkling in spar 204 with kink 292. Cuts 270 are present desired distance 272 from kink 208 to be formed in composite laminate 202. In some illustrative examples, cuts 270 are placed in staggered fashion 273 through a thickness of composite laminate 202. By being placed in staggered fashion 273, cuts 270 comprise plurality of distances 274 from kink 208. By being placed in staggered fashion 273, cuts 270 are on both sides of kink 208 within desired distance 272 of kink 208.

In some illustrative examples, composite laminate 202 optionally includes extended zero degree ply 276. When present, extended zero degree ply 276 is continuous. When present, extended zero degree ply 276 extends past plurality of composite plies 266 in a longitudinal direction. When present, extended zero degree ply 276 can be held to apply tension. In some illustrative examples, extended zero degree ply 276 is clamped or otherwise restrained on a backside of first vacuum plate 215 and second vacuum plate 217. In some illustrative examples, extended zero degree ply 276 can be restrained by number of rollers 299. Extended zero degree ply 276 can be initially held by number of rollers 299 by vacuum, a mechanical clamp, adhesive, or any other initial securement. After initially holding ends of extended zero degree ply 276 on number of rollers 299, ends of extended zero degree ply 276 are rolled onto number of rollers 299. In some illustrative examples, rolling extended zero degree ply 276 on number of rollers 299 applies tension. In some illustrative examples, movement of number of rollers 299 after rolling extended zero degree ply 276 onto number of rollers 299 applies tension.

After lifting composite laminate 202, first portion 205 and second portion 222 are clamped against vacuum lift face 210. In some illustrative examples, number of bladders 254 can be used to apply a compressive force to composite laminate 202. After lifting composite laminate 202, first clamping plate 224 is placed in clamping configuration 253 to clamp first portion 205 of composite laminate 202 against first vacuum plate 215. In some illustrative examples, first number of bladders 255 can be optionally used to apply a set compressive force to first portion 205.

After lifting composite laminate 202, second clamping plate 226 is placed in clamping configuration 257 to clamp second portion 222 of composite laminate 202 against second vacuum plate 217. In some illustrative examples, second number of bladders 256 can be optionally used to apply a set compressive force to second portion 222.

After clamping first portion 205 and second portion 222, vacuum lift face 210 is moved from flat configuration 216 to forming configuration 218. The transition between flat configuration 216 and forming configuration 218 can be performed at any effective speed. A speed is chosen for transition that will allow the resin within composite laminate 202 to flow. In some illustrative examples, the transition between flat configuration 216 and forming configuration 218 is performed substantially continuously. In some illustrative examples, the transition between flat configuration 216 and forming configuration 218 can be performed in a pulsed fashion, with pauses between incremental movements of vacuum lift face 210.

In some illustrative examples, first motor 258 and second motor 259 are operated in a same fashion, such as a same speed and same pattern of movement. In some illustrative examples, first motor 258 and second motor 259 are operated in different patterns.

With vacuum lift face 210 in forming configuration 218, pick and place end effector 206 has bent composite laminate 202 to form kink 208. Composite laminate 202 with kink 208 is referred to as bent composite laminate 280. Pick and place end effector 206 lifts flat uncured composite laminate 278 and introduces kink 208 in mid-air to form bent composite laminate 280 prior to placing on mandrel 282.

After placing vacuum lift face 210 in forming configuration 218, first clamping plate 224 is placed into open configuration 251 and second clamping plate 226 is placed in open configuration 203. Bent composite laminate 280 is placed in contact with web surface 285 of mandrel 282. In some illustrative examples, a Z position of composite laminate 202 is adjusted using Z motor 294 of pick and place end effector 206 to place bent composite laminate 280 in contact with mandrel 282. Vacuum to vacuum lift face 210 is stopped and bent composite laminate 280 is left on mandrel 282.

Pick and place end effector 206 can apply additional pressure to composite laminate 202 as composite laminate 202 is placed onto mandrel 282. Pick and place end effector 206 can apply additional pressure to composite laminate 202 over kink 284 in web surface 285 to reduce or eliminate gap conditions after composite laminate 202 is released from pick and place end effector 206 and matches mandrel 282.

Mandrel 282 has web surface 285 with kink 284 matching kink 208 in composite laminate 202. Kink 284 forms an angle between portions of web surface 285. Kink 284 forms an angle between portions of web surface 285 in longitudinal direction 283 of mandrel 282.

Bent composite laminate 280 on mandrel 282 is introduced to spar forming assembly 288 to continue processing of bent composite laminate 280. Spar forming assembly 288 forms bent composite laminate 280 against sides 286 of mandrel 282 to form spar 204.

Spar 204 comprises web 290 and flanges 291. Kink 292 in spar 204 is perpendicular to longitudinal direction 293. Kink 292 in spar 204 forms an angle between two portions of web 290 in longitudinal direction 293.

Flanges 291 are created by forming composite laminate 202 against flange forming surfaces 287 of mandrel 282. Flange forming surfaces 287 are portions of sides 286 of mandrel 282. Web 290 with kink 284 is at least partially formed by pick and place end effector 206. Web 290 with kink 292 is held against web surface 285 of mandrel 282 during forming of flanges 291 in spar forming assembly 288. Kink 292 is substantially the same to kink 208 in bent composite laminate 280.

The illustration of manufacturing environment 200 in FIGS. 2A and 2B is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although plurality of zero degree plies 268 comprise cuts 270, in some illustrative examples, one or more additional zero degree plies that are uncut can be present in composite laminate 202. In some illustrative examples one or more continuous zero degree plies is present in composite laminate 202 to prevent undesirable stretching of composite laminate 202.

As another example, heat can be applied in composite laminate 202 in region of kink 208. Heat can be applied in the form of convection, conduction, or radiation in the region of kink 208 to speed up the forming process. In some illustrative examples, heat could also be applied in localized areas to control ply slippage. In some illustrative examples, heating system 209 can be connected to pick and place end effector 206 as a portion of pick and place end effector 206. In other illustrative examples, an independent heating system can be moved to apply heat to composite laminate 202 on pick and place end effector 206. Heating system 209 can be optional.

As yet another example, although one pick and place end effector is discussed, multiple pick and place end effectors can be used to lift and form composite laminate 202. In some illustrative examples, composite laminate 202 can have multiple kinks formed by multiple pick and place end effectors including kink 208 formed by pick and place end effector 206. In these illustrative examples, movements of the multiple pick and place end effectors would be coordinated to form several kinks and place composite laminate 202 with the several kinks on mandrel 282.

Additionally, although pick and place end effector 206 is depicted as forming a single kink, kink 208, pick and place end effector 206 can be used to form a plurality of kinks in composite laminate 202. In some illustrative examples, the width of center vacuum portion 213 can be increased to form two independent kinks, a first kink at the intersection of first vacuum plate 215 and center vacuum portion 213 and a second kink at the intersection of second vacuum plate 217 and center vacuum portion 213. In other illustrative examples, vacuum lift face 210 can include additional portions in addition to first vacuum plate 215, center vacuum portion 213, and second vacuum plate 217 to form an additional kink in composite laminate 202.

Figure 3:
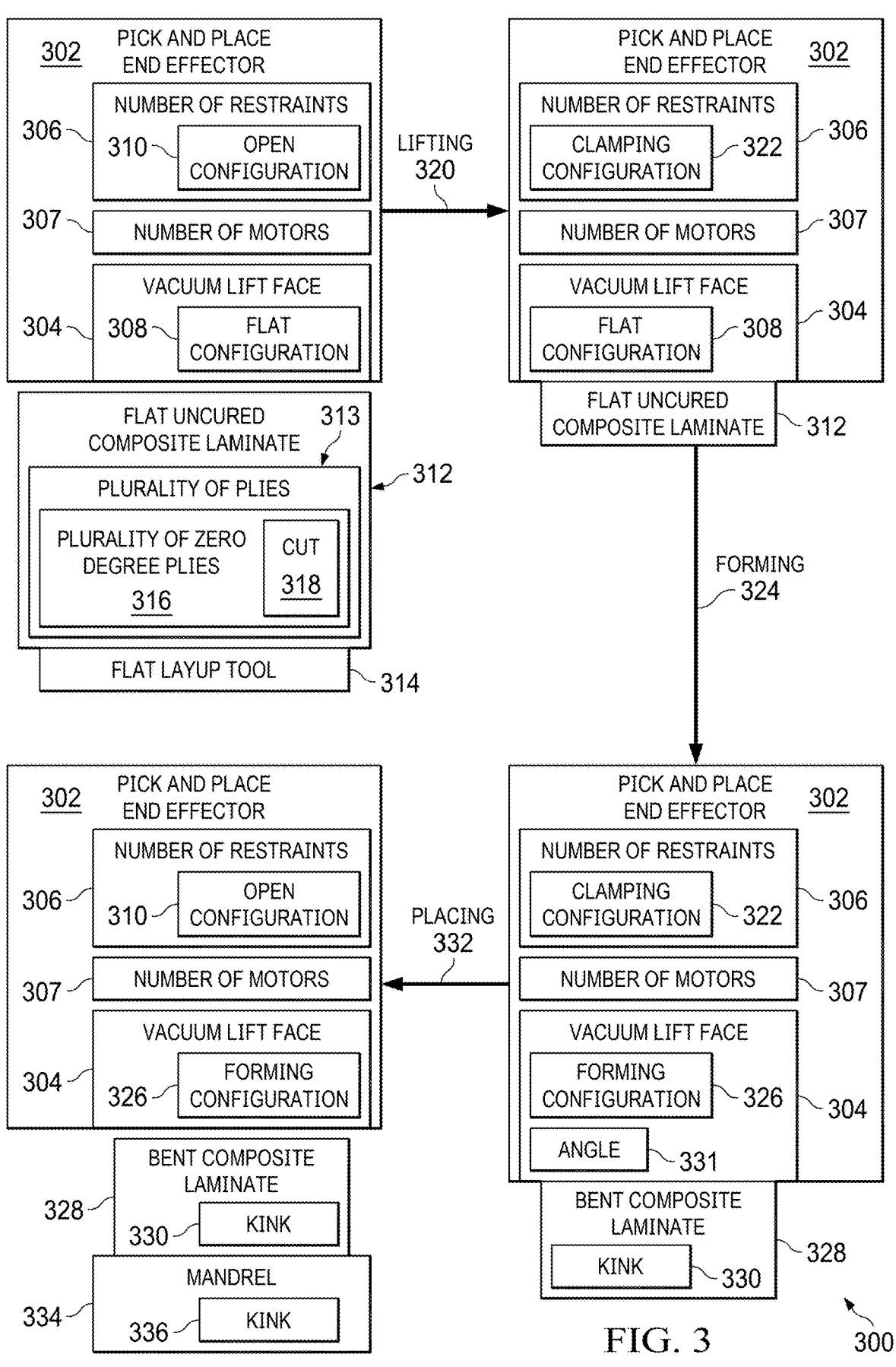
FIG. 3 is an illustration of a block diagram of a flowchart of forming in a kink using a pick and place end effector in accordance with an illustrative embodiment.

Turning now to FIG. 3, an illustration of a block diagram of a flowchart of forming in a kink using a pick and place end effector is depicted in accordance with an illustrative embodiment. In method 300, pick and place end effector 302 is used to lift flat uncured composite laminate 312 and form a kink. Pick and place end effector 302 can be the same as pick and place end effector 206 of FIGS. 2A and 2B. Pick and place end effector 302 comprises vacuum lift face 304, number of restraints 306, and number of motors 307. Vacuum lift face 304 is configured to hold a composite laminate and form a kink into the composite laminate. Number of restraints 306 is configured to clamp portions of the composite laminate on vacuum lift face 304 during movement. Number of motors 307 is configured to move the vacuum lift face to form the kink in the composite laminate.

Flat uncured composite laminate 312 is present on flat layup tool 314. In some illustrative examples, flat uncured composite laminate 312 was laid up on flat layup tool 314. In some illustrative examples, flat uncured composite laminate 312 can be laid up on a different tool and then placed onto flat layup tool 314 for lifting by pick and place end effector 302.

Flat uncured composite laminate 312 is formed of plurality of plies 313. Plurality of plies 313 comprise plurality of zero degree plies 316. Plurality of zero degree plies 316 is cut 318 to allow for forming of flat uncured composite laminate 312. In some illustrative examples, plurality of plies 313 comprises one or more additional zero degree plies in addition to plurality of zero degree plies 316.

Prior to lifting 320 flat uncured composite laminate 312, vacuum lift face 304 of pick and place end effector 302 is in flat configuration 308. In flat configuration 308, vacuum lift face 304 can be placed into contact with flat uncured composite laminate 312. When vacuum lift face 304 is in contact with flat uncured composite laminate 312, vacuum is applied through vacuum lift face 304 to hold flat uncured composite laminate 312. Prior to lifting 320 flat uncured composite laminate 312, number of restraints 306 are in open configuration 310 to allow access to vacuum lift face 304.

Pick and place end effector 302 performs lifting 320 to remove flat uncured composite laminate 312 from flat layup tool 314. After lifting 320 flat uncured composite laminate 312 from flat layup tool 314, number of restraints 306 is placed into clamping configuration 322. In clamping configuration, number of restraints 306 clamps portions of flat uncured composite laminate 312 on vacuum lift face 304. By clamping portions of flat uncured composite laminate 312, tension in the neutral axis of flat composite laminate is maintained during forming 324.

Pick and place end effector 302 forms bent composite laminate 328 by forming 324 kink 330 into flat uncured composite laminate 312. During forming 324, vacuum lift face 304 holds flat uncured composite laminate 312 and moves from flat configuration 308 to forming configuration 326. In forming configuration 326, angle 331 is present in vacuum lift face 304 to form kink 330 in bent composite laminate 328. Number of motors 307 moves vacuum lift face 304 between flat configuration 308 and forming configuration 326. Number of restraints 306 remains in clamping configuration 322 and continues to clamp the portions of bent composite laminate 328 during movement between flat configuration 308 and forming configuration 326.

During placing 332 of bent composite laminate 328 on mandrel 334, pick and place end effector 302 remains in forming configuration 326 with angle 331 in vacuum lift face 304. Angle 331 in vacuum lift face 304 matches kink 336 in mandrel 334. Bent composite laminate 328 is placed onto mandrel 334 by pick and place end effector 302. During placing 332 of bent composite laminate 328 on mandrel 334, number of restraints are in open configuration 310 to allow bent composite laminate 328 to contact mandrel 334.

Figure 4:
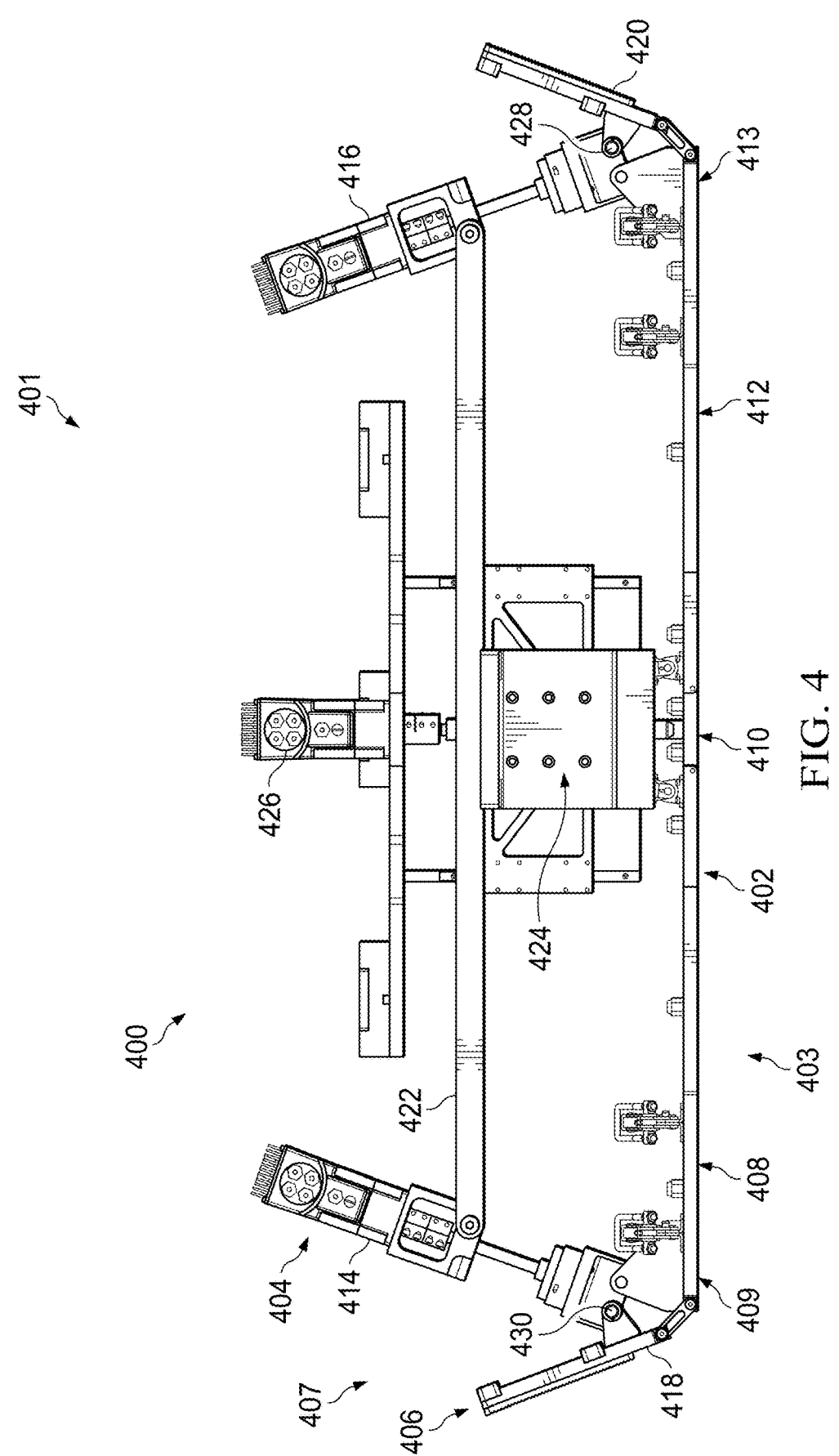
FIG. 4 is an illustration of a side view of a pick and place end effector in a flat configuration with a number of restraints in an open configuration in accordance with an illustrative embodiment.

Turning now to FIG. 4, an illustration of a side view of a pick and place end effector in a flat configuration with a number of restraints in an open configuration is depicted in accordance with an illustrative embodiment. Pick and place end effector 400 can be used to manufacture composite parts of aircraft 100 of FIG. 1. Pick and place end effector 400 is a physical implementation of pick and place end effector 206 of FIGS. 2A and 2B. Pick and place end effector 400 can be a physical implementation of pick and place end effector 302 of FIG. 3. Pick and place end effector 400 can perform lifting 320, forming 324, and placing 332 of a composite laminate.

Pick and place end effector 400 comprises vacuum lift face 402, number of motors 404, and number of restraints 406. As depicted in view 401, number of restraints 406 is in open configuration 407. With number of restraints 406 in open configuration 407, vacuum lift face 402 can be used to contact a composite laminate.

Vacuum lift face 402 comprises first vacuum plate 408, stationary center vacuum portion 410, and second vacuum plate 412. First vacuum plate 408 is movably connected to center vacuum portion 410. Second vacuum plate 412 is movably connected to center vacuum portion 410 such that center vacuum portion 410 is between first vacuum plate 408 and second vacuum plate 412. Vacuum lift face 402 is in flat configuration 403 to receive a composite laminate. Flat configuration 403 can be a physical implementation of flat configuration 308 of FIG. 3.

Number of motors 404 is configured to move vacuum lift face 402. Number of motors 404 comprises first motor 414 and second motor 416. First motor 414 is connected to first vacuum plate 408. First motor 414 is configured to move first vacuum plate 408 relative to center vacuum portion 410. To move first vacuum plate 408 into a forming configuration, such as forming configuration 326 of FIG. 3, first motor 414 can be retracted.

As depicted, number of motors 404 comprises first motor 414 connected to first vacuum plate 408 at end 409 opposite center vacuum portion 410. As depicted, number of motors 404 comprises second motor 416 connected to second vacuum plate 412 at end 413 opposite center vacuum portion 410. As can be seen, number of motors 404 is connected to an opposite face of first vacuum plate 408 and second vacuum plate 412 than vacuum lift face 402. The opposite face may be referred to as a backside of first vacuum plate 408 and second vacuum plate 412.

Second motor 416 is configured to move second vacuum plate 412 relative to center vacuum portion 410. To move second vacuum plate 412 into a forming configuration, second motor 416 can be retracted.

Number of restraints 406 comprises first First clamping plate 418 and second clamping plate 420. First clamping plate 418 is configured to clamp a portion of a composite laminate against first vacuum plate 408. Second clamping plate 420 is configured to clamp a second portion of a composite laminate against second vacuum plate 412. In some illustrative examples, the first portion and the second portion can be ends of the composite laminate. The portions are within a desired distance of center vacuum portion 410 to maintain tension in the composite laminate.

First motor 414 and second motor 416 are connected to back plate 422. Back plate 422 connects components of pick and place end effector 400 to Z-motor 426. Z-motor 426 moves vacuum lift face 402, number of motors 404, and number of restraints 406 to position a composite laminate held by the vacuum lift face 402 to a desired accuracy. Center vacuum portion 410 is rigidly connected to strongback 424. Strongback 424 maintains position of center vacuum portion 410.

In this illustrative example, in open configuration 407, second clamping plate 420 is connected to second motor 416 at connection point 428. In this illustrative example, in open configuration 407, first clamping plate 418 is connected to first motor 414 at connection point 430.

Figure 5:
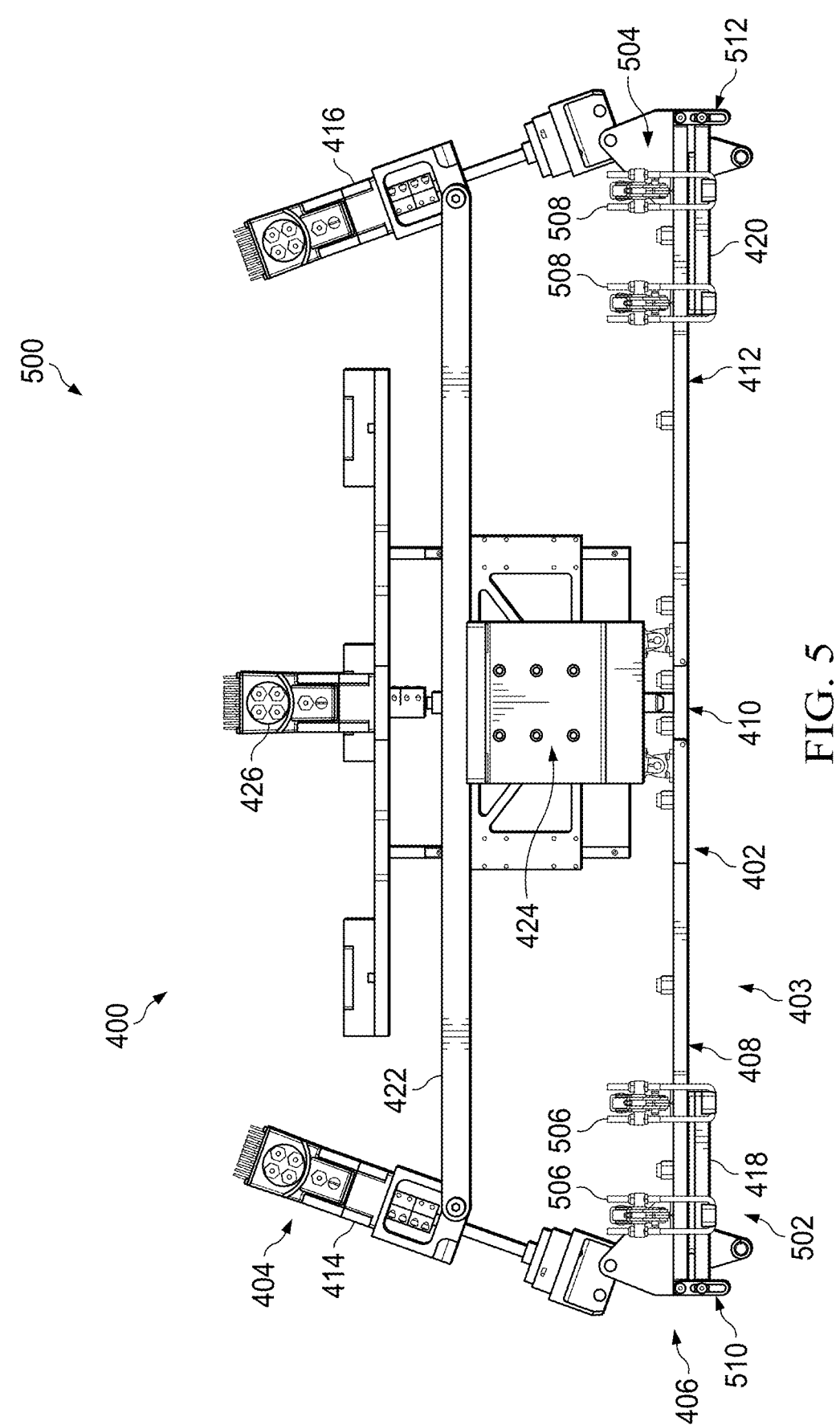
FIG. 5 is an illustration of a side view of a pick and place end effector in a flat configuration with a number of restraints in a clamping configuration in accordance with an illustrative embodiment.

Turning now to FIG. 5, an illustration of a side view of a pick and place end effector in a flat configuration with a number of restraints in a clamping configuration is depicted in accordance with an illustrative embodiment. View 500 is a side view of pick and place end effector 400 with vacuum lift face 402 in flat configuration 403 and number of restraints 406 in clamping configuration 502. In clamping configuration 502, first clamping plate 418 has been released from first motor 414. By clamping portions of a flat composite laminate, tension in the flat composite laminate is maintained during forming.

In clamping configuration 502, first clamping plate 418 is retained by mechanical restraints 504. Mechanical restraints 504 comprise clamps 506. Clamps 506 maintain a set distance between first clamping plate 418 and first vacuum plate 408.

Mechanical restraints 504 comprise clamps 508. Clamps 508 maintain a set distance between second clamping plate 420 and second vacuum plate 412.

First clamping plate 418 moves relative to first vacuum plate 408 using hinge 510. Hinge 510 comprises an open channel to allow a distance between first clamping plate 418 and first vacuum plate 408 to be adjusted. In some illustrative examples, the distance between first clamping plate 418 and first vacuum plate 408 can be adjusted based on a thickness of a composite laminate to be lifted. In some illustrative examples, the distance between first clamping plate 418 and first vacuum plate 408 can be adjusted based on a desired amount of compaction to be applied to a composite laminate.

Second clamping plate 420 moves relative to second vacuum plate 412 using hinge 512. Hinge 512 comprises an open channel to allow a distance between second clamping plate 420 and second vacuum plate 412 to be adjusted. In some illustrative examples, the distance between second clamping plate 420 and second vacuum plate 412 can be adjusted based on a thickness of a composite laminate to be lifted. In some illustrative examples, the distance between second clamping plate 420 and second vacuum plate 412 can be adjusted based on a desired amount of compaction to be applied to a composite laminate.

Pick and place end effector 400 can have vacuum lift face 402 in flat configuration 403 and number of restraints 406 in clamping configuration 502 as in view 500 can be present after lifting 320 and prior to forming 324. After a composite laminate is clamped by number of restraints 406, pick and place end effector 400 can be used to form a kink in the composite laminate.

Figure 6:
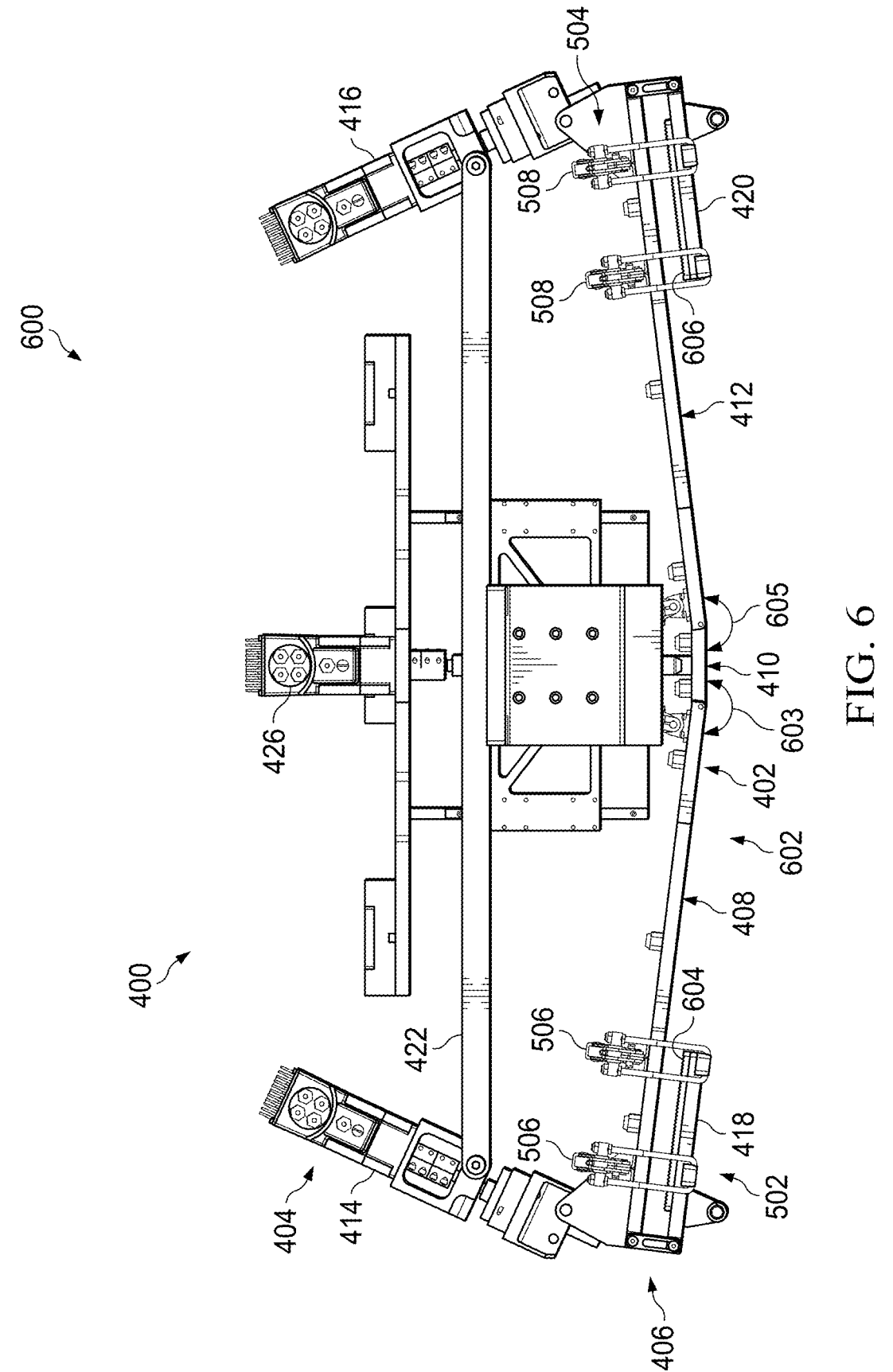
FIG. 6 is an illustration of a side view of a pick and place end effector in a forming configuration with a number of restraints in a clamping configuration in accordance with an illustrative embodiment.

Turning now to FIG. 6, an illustration of a side view of a pick and place end effector in a forming configuration with a number of restraints in a clamping configuration is depicted in accordance with an illustrative embodiment. In view 600, vacuum lift face 402 has transitioned between flat configuration 403 and forming configuration 602. In forming configuration 602, vacuum lift face 402 has angle 603 between first vacuum plate 408 and center vacuum portion 410 and angle 605 between second vacuum plate 412 and center vacuum portion 410. In view 600, number of restraints 406 is in clamping configuration 502. View 500 and view 600 show two different distances between number of restraints 406 and vacuum lift face 402.

Pick and place end effector 400 can move between flat configuration 403 and forming configuration 602 in any desirable fashion. In some illustrative examples, pick and place end effector 400 can move from flat configuration 403 and forming configuration 602 at a continuous rate. In some illustrative examples, pick and place end effector 400 can move from flat configuration 403 and forming configuration 602 in a series of incremental changes.

Mechanical teeth 604 of first clamping plate 418 are visible in view 600. Mechanical teeth 606 of second clamping plate 420 are visible in view 600. Mechanical teeth 604 and mechanical teeth 606 are present to reduce or prevent slipping between the composite laminate and first clamping plate 418 and second clamping plate 420. In some illustrative examples, mechanical teeth may also be referred to as gripping teeth.

Figure 7:
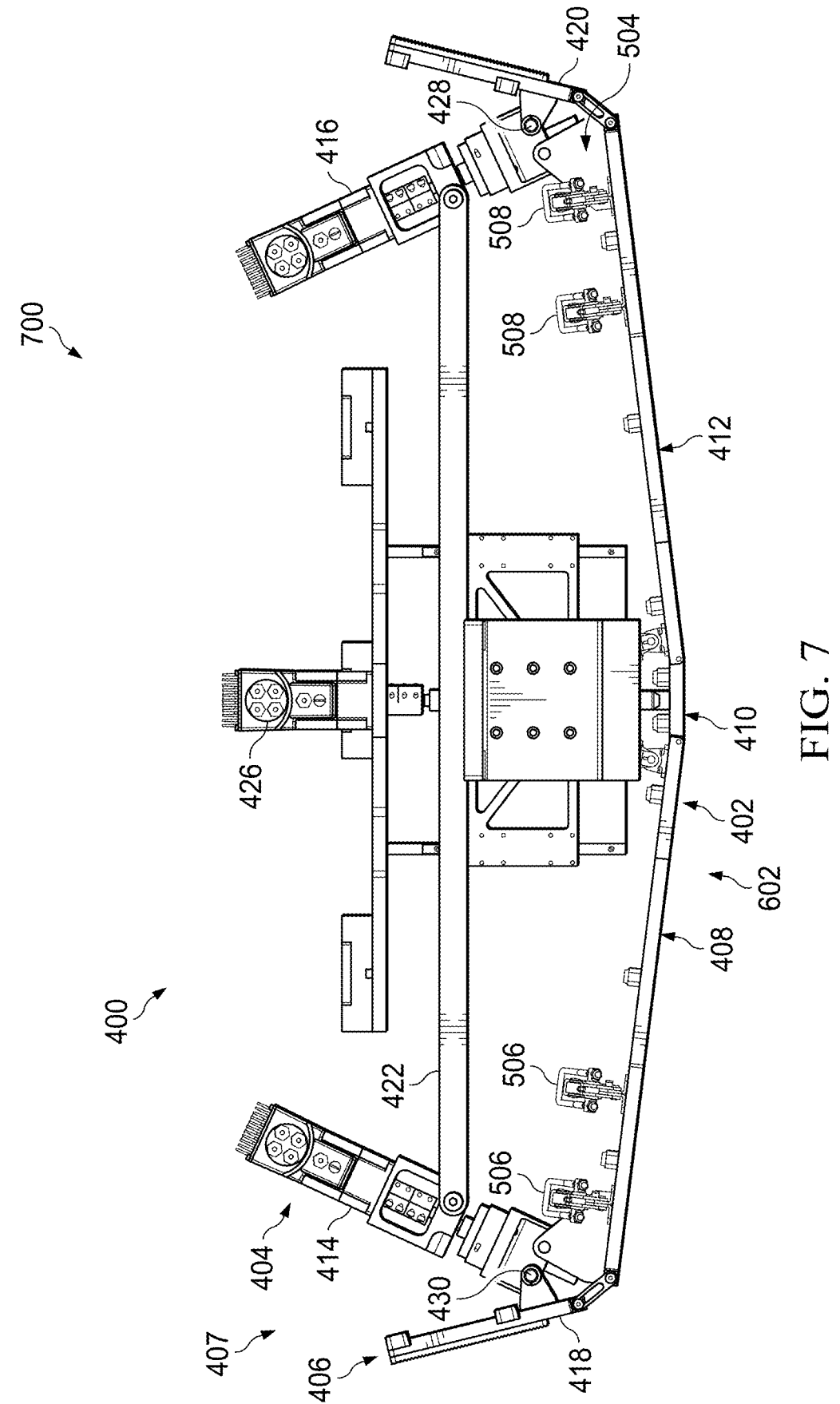
FIG. 7 is an illustration of a side view of a pick and place end effector in a forming configuration with a number of restraints in an open configuration in accordance with an illustrative embodiment.

Turning now to FIG. 7, an illustration of a side view of a pick and place end effector in a forming configuration with a number of restraints in an open configuration is depicted in accordance with an illustrative embodiment. In view 700, number of restraints have transitioned back to open configuration 407. In open configuration 407, vacuum lift face 402 is visible. With number of restraints 406 in open configuration 407 and vacuum lift face 402 in forming configuration 602, a composite laminate can be placed by pick and place end effector 400 onto a forming mandrel, such as forming mandrel 1000 of FIG. 10.

Figure 8:
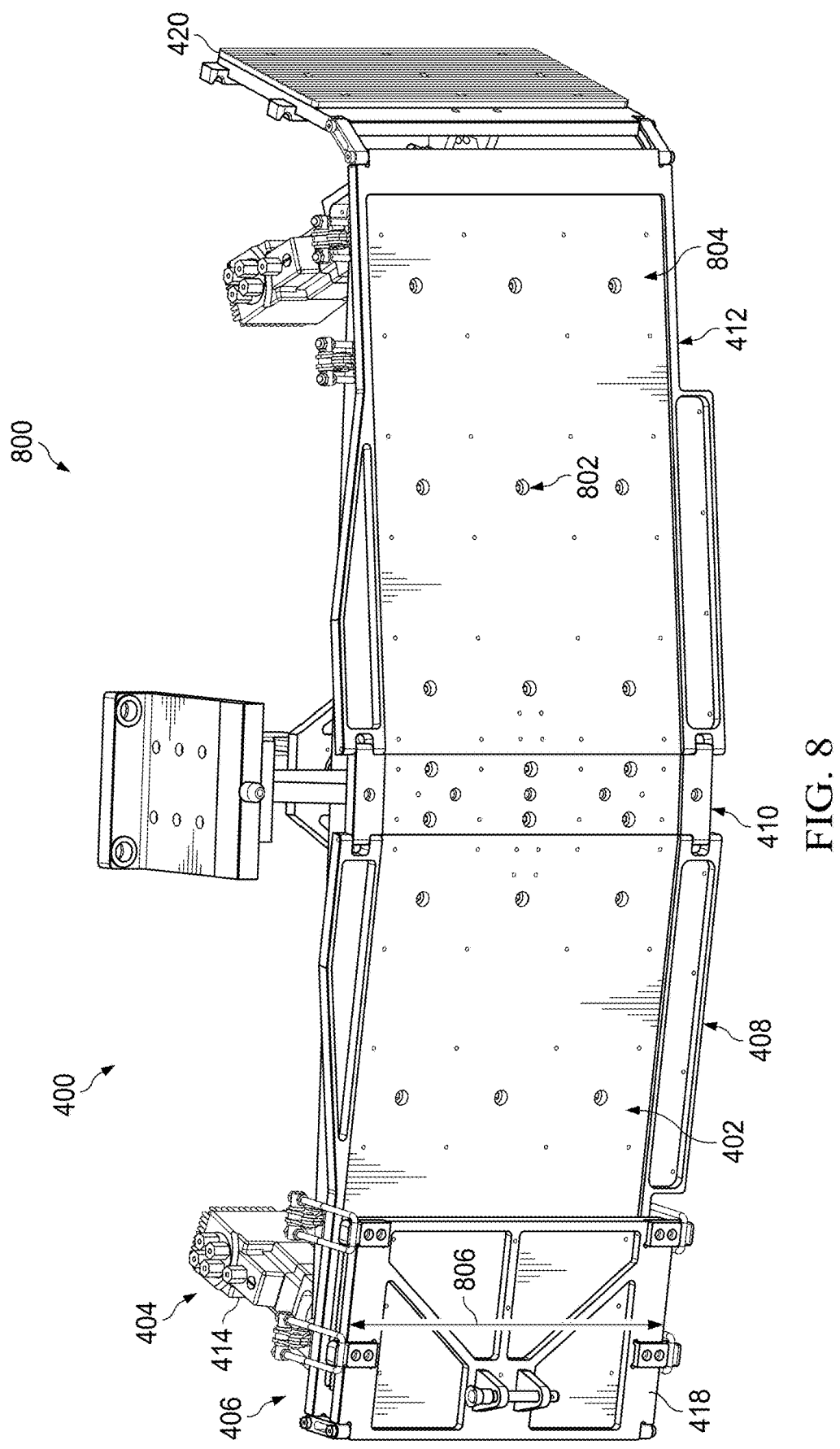
FIG. 8 is an illustration of a side view of a pick and place end effector in a forming configuration with a number of restraints in different configurations in accordance with an illustrative embodiment.

Turning now to FIG. 8, an illustration of a bottom view of a pick and place end effector in a forming configuration with a number of restraints in different configurations is depicted in accordance with an illustrative embodiment. In view 800 vacuum lift face 402 is visible. In view 800, vacuum ports 802 extending through vacuum lift face 402 are visible. Vacuum ports 802 provide vacuum to vacuum distribution 804 in vacuum lift face 402. As depicted, vacuum distribution 804 comprises a number of channels in vacuum lift face 402. Any desirable design and components of vacuum distribution 804 can be provided to lift and place a composite laminate.

As can be seen in view 800, number of restraints 406, including first clamping plate 418, is configured to clamp a full width of a composite charge. For example, width 806 of first clamping plate 418 is sufficient to clamp a full width of a composite charge held on vacuum lift face 402. Width 806 of first clamping plate 418 fully extends over a width of first vacuum plate 408.

Although pick and place end effector 400 is depicted as forming a single kink, pick and place end effector 400 can be used to form a plurality of kinks in a composite laminate. In some illustrative examples, the width of center vacuum portion 410 can be increased to form two independent kinks, a first kink at the intersection of first vacuum plate 408 and center vacuum portion 410 and a second kink at the intersection of second vacuum plate 412 and center vacuum portion 410. In other illustrative examples, vacuum lift face 402 can include additional portions in addition to first vacuum plate 408, center vacuum portion 410, and second vacuum plate 412 to form an additional kink in a composite laminate.

Figure 9:
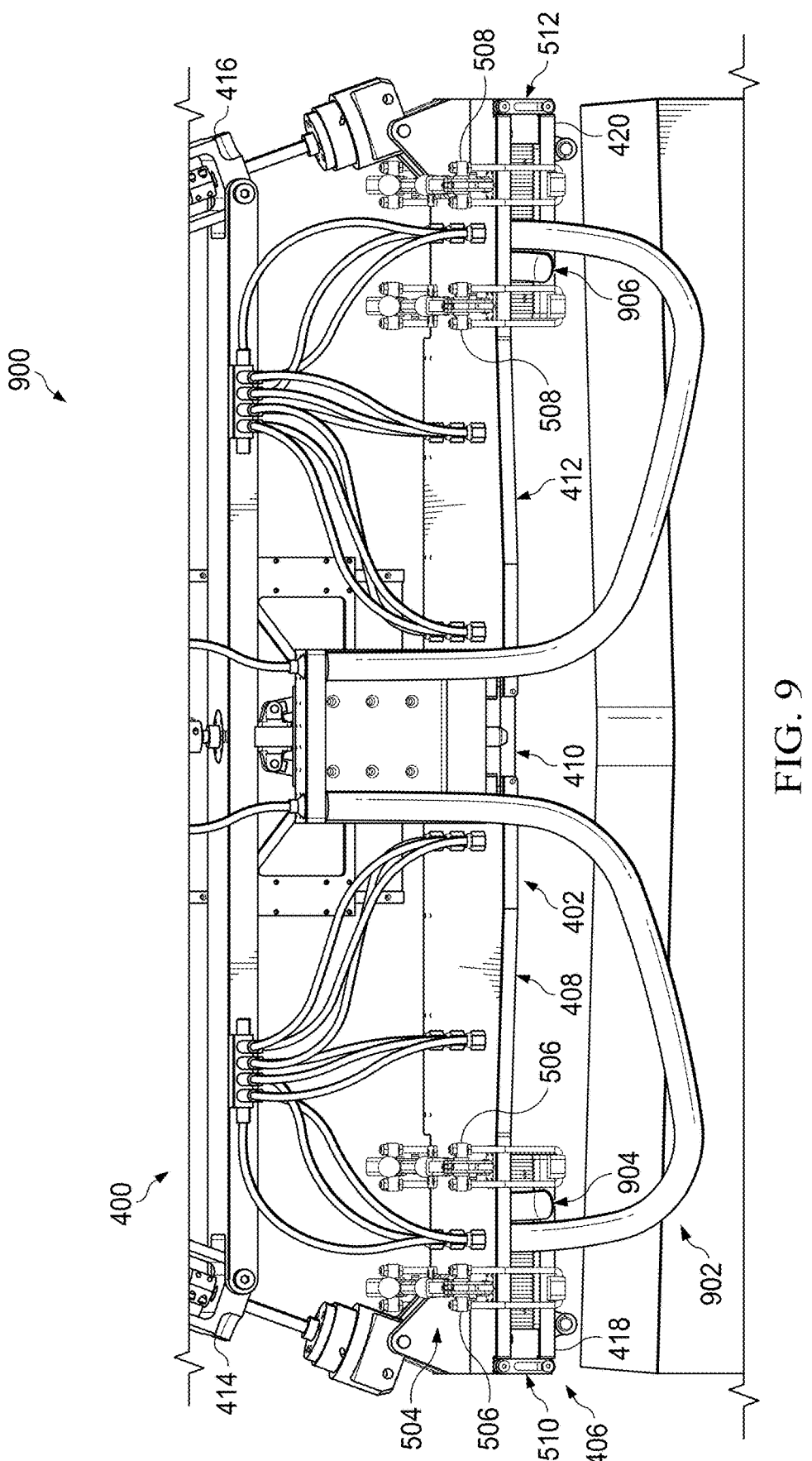
FIG. 9 is an illustration of a side view of a pick and place end effector with a number of bladders in accordance with an illustrative embodiment.

Turning now to FIG. 9, an illustration of a side view of a pick and place end effector with a number of bladders is depicted in accordance with an illustrative embodiment. In view 900, number of bladders 902 is provided to apply a compression force to a composite laminate held on pick and place end effector 400. In this illustrative example, number of bladders 902 is positioned between number of restraints 406 and the composite laminate (not depicted). Number of bladders 902 includes first bladder 904 between first clamping plate 418 and first vacuum plate 408 and second bladder 906 between second clamping plate 420 and second vacuum plate 412. First bladder 904 will place a compression force against a first end of the composite laminate (not depicted). Second bladder 906 will place a compression force against a second portion of the composite laminate (not depicted)

Number of bladders 902 can have any desirable size and shape. Number of bladders 902 is configured to apply compression force to a full width of the composite laminate. Number of bladders 902 is filled to a known pressure so that a clamping pressure that is applied to the charge is known. The surface of number of bladders 902 is configured to reduce or prevent slippage between number of bladders and the composite laminate. In this illustrative example, number of restraints 406 does not contact the composite laminate. In this illustrative example, mechanical teeth may not be present on number of restraints 406.

Figure 10:
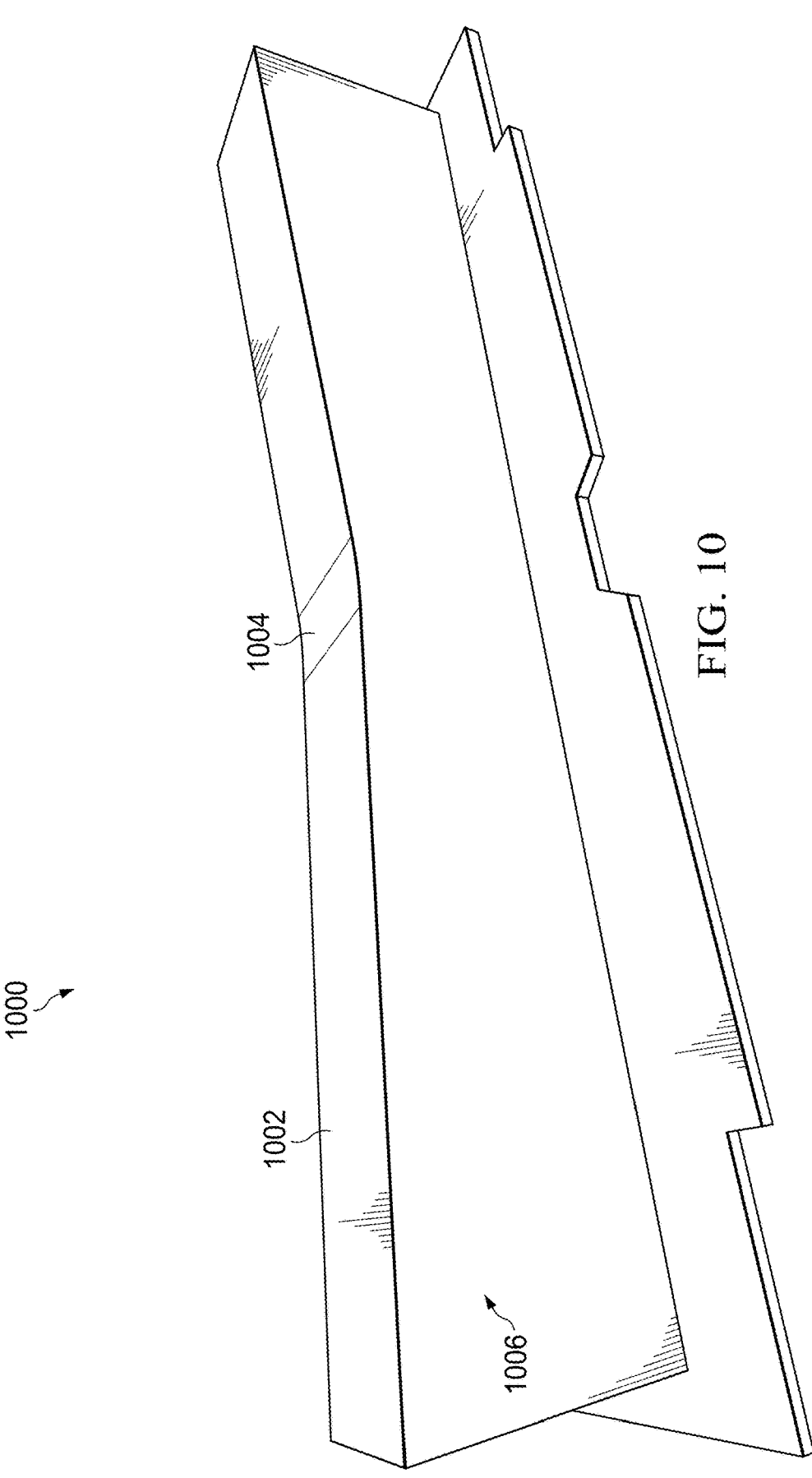
FIG. 10 is an illustration of an isometric view of a forming mandrel in accordance with an illustrative embodiment.

Turning now to FIG. 10, an illustration of an isometric view of a forming mandrel is depicted in accordance with an illustrative embodiment. Mandrel 1000 can be used to form a composite structure of aircraft 100 of FIG. 1. Mandrel 1000 can be a physical implementation of mandrel 282 of FIGS. 2A and 2B. Mandrel 1000 can be physical implementation of mandrel 334 of FIG. 3. Pick and place end effector 400 of FIGS. 4-8 can be used to place a composite laminate on mandrel 1000.

Mandrel 1000 comprises web surface 1002 with kink 1004 and flange surface 1006. Web surface 1002 is configured to shape a web portion of a spar. Flange surface 1006 is configured to shape flange portions of a spar.

A composite laminate held by pick and place end effector 400 in forming configuration 602 can be placed on mandrel 1000. Angle 603 and angle 605 are configured to match kink 1004 in web surface 1002.

Turning now to FIG. 11, a flowchart of a method of forming a kink into a composite laminate is depicted in accordance with an illustrative embodiment. Method 1100 can be used to form composite portions of aircraft 100 of FIG. 1. Method 1100 can be performed using pick and place end effector 206 of FIGS. 2A and 2B. Method 1100 can be performed using pick and place end effector 302 of FIG. 3. Method 1100 can be performed using pick and place end effector 400 of FIGS. 4-9. Method 1100 can be performed to place a composite laminate on mandrel 1000 of FIG. 10.

Method 1100 lifts a composite laminate on a vacuum lift face of a pick and place machine, the vacuum lift face configured to hold the composite laminate and move from a flat configuration to a forming configuration with an angle in the vacuum lift face to form the kink in the composite laminate (operation 1102). Method 1100 clamps portions of the composite laminate on the vacuum lift face (operation 1104). Method 1100 moves the vacuum lift face between the flat configuration and the forming configuration to form a kink in the composite laminate to form a bent composite laminate while the portions are clamped on the vacuum lift face (operation 1106). Method 1100 places the bent composite laminate on a mandrel having the kink (operation 1108). Afterwards, method 1100 terminates.

In some illustrative examples, lifting the composite laminate on the vacuum lift face comprises drawing a vacuum through a first vacuum plate and a second vacuum plate of the vacuum lift face (operation 1110). In some illustrative examples, lifting the composite laminate comprises moving the pick and place end effector using one of a robotic arm or a gantry (operation 1112).

In some illustrative examples, clamping portions of the composite laminate on the vacuum lift face comprises clamping a first portion of the composite laminate to the first vacuum plate and a second portion of the composite laminate to the second vacuum plate (operation 1114). In some illustrative examples, the clamping is performed within a set distance from a kink to be formed in a composite laminate. In some illustrative examples, portions of the composite laminate are supported by vacuum or another support system.

In some illustrative examples, clamping the first portion of the composite laminate to the first vacuum plate comprises rotating a first clamping plate relative to the first vacuum plate and securing the first clamping plate relative to the vacuum plate (operation 1116).

In some illustrative examples, moving the vacuum lift face between the flat configuration and the forming configuration to form the kink comprises rotating the first vacuum plate and the second vacuum plate away from the composite laminate about a center vacuum portion connected to the first vacuum plate and the second vacuum plate to form the kink in the composite laminate (operation 1118).

In some illustrative examples, rotating the first vacuum plate away from the composite laminate comprises retracting a first motor connected to the first vacuum plate (operation 1120). In some illustrative examples, placing the bent composite laminate on the mandrel comprises adjusting a Z position of the composite laminate using a Z motor of the pick and place end effector (operation 1122).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 1110 through operation 1122 may be optional.

Figures 12, 13:
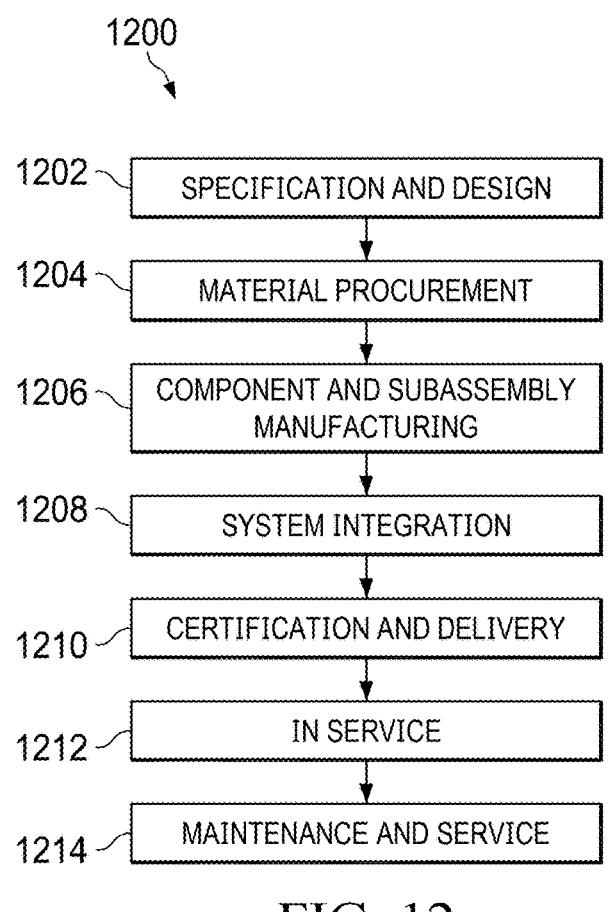
FIG. 12 is an illustration of an aircraft manufacturing and service method in a form of a block diagram in accordance with an illustrative embodiment.
FIG. 13 is an illustration of an aircraft in a form of a block diagram in which an illustrative embodiment may be implemented.

Illustrative embodiments of the present disclosure may be described in the context of aircraft manufacturing and service method 1200 as shown in FIG. 12 and aircraft 1300 as shown in FIG. 13. Turning first to FIG. 12, an illustration of an aircraft manufacturing and service method in a form of a block diagram is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 takes place. Thereafter, aircraft 1300 may go through certification and delivery 1210 in order to be placed in service 1212. While in service 1212 by a customer, aircraft 1300 is scheduled for routine maintenance and service 1214, which may include modification, reconfiguration, refurbishment, or other maintenance and service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft in a form of a block diagram is depicted in which an illustrative embodiment may be implemented. In this example, aircraft 1300 is produced by aircraft manufacturing and service method 1200 of FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included.

Apparatuses and methods embodied herein may be employed during at least one of the stages of aircraft manufacturing and service method 1200. One or more illustrative embodiments may be manufactured or used during at least one of component and subassembly manufacturing 1206, system integration 1208, in service 1212, or maintenance and service 1214 of FIG. 12.

The illustrative examples provide an end effector with hinge-coupled vacuum plates suspended on a robot or a gantry. The vacuum plates pick a flat, green spar charge, clamp portions of the composite charge on opposite sides of the intended kink using clamping plates to hold in full tension, then impart a desired kink by bending one/both vacuum plates.

The illustrative examples provide a novel approach to maintaining a composite full stack in tension during the forming of a kink to reduce or prevent wrinkle formation and undesirable detriment to structural integrity. The methods of forming and pick and place end effector maintain composite full stack in complete tension during forming.

The illustrative examples provide an end-effector that can be mounted on a robot or gantry system. In the illustrative examples a flat green spar charge is conveyed into a work space/cell. The end effector locates the spar charge and moves into place above the spar charge. The end-effector moves down and draws vacuum to pick up the spar charge. The end-effector's motors move/pulse to kink the spar charge in the center. The charge with the kink is placed on a mandrel to receive additional forming and processing. The illustrative examples allow green spar charges to be picked and placed as well as kinked without the need for manual labor.

The neutral axis of the combined vacuum plate and composite laminate is outside the composite laminate at the interface between the two or slightly in the vacuum plate. In the illustrative examples, the composite laminate is maintained in position on the vacuum plate by a combination of vacuum and a number of restraints clamping the composite laminate, having vacuum plate in compression and keeping the entire composite laminate in tension to prevent wrinkle formation.

Picking up the spar with vacuum and placing it down has been shown by previous end effectors, but the illustrative examples allow for more work to be done on a composite charge prior to placing on the mandrel other than just picking and placing. The composite charge is kinked mid-air via motors attached to the vacuum plates. The illustrative examples automate multiple processes that are currently manually performed.

The illustrative examples resolve high buy-in cost for traditional spar installation processes. The illustrative examples reduce the number of processes to form a spar with a kink. The illustrative examples reduce the part movement to completion. The illustrative examples reduce time lost to re-indexing parts. The illustrative examples reduce manual installation and can reduce undesirable ergonomic operations.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A pick and place end effector configured to form a kink in a composite laminate, wherein the pick and place end effector comprises:

a vacuum lift face that comprises a first vacuum plate, a center vacuum portion and a second vacuum plate, all configured to hold the composite laminate and move from a flat configuration to a forming configuration that comprises an angle between the first vacuum plate and the center vacuum portion and a second angle between the second vacuum plate and the center vacuum portion and forms the kink in the composite laminate;

motors configured to move the vacuum lift face between the flat configuration and the forming configuration; and a number of restraints configured to clamp portions of a composite laminate on opposite sides of the kink on the vacuum lift face during movement between the flat configuration and the forming configuration.

2. The pick and place end effector of claim 1, wherein the vacuum lift face comprises:

the forming configuration configured to hold the composite laminate only in tension;

the first vacuum plate movably connected to the center vacuum portion; and the second vacuum plate movably connected to the center vacuum portion such that the center vacuum portion is between the first vacuum plate and the second vacuum plate.

3. The pick and place end effector of claim 2, wherein the motors comprises a first motor connected to the first vacuum plate at an end opposite the center vacuum portion and a second motor connected to the second vacuum plate at an end opposite the center vacuum portion.

4. The pick and place end effector of claim 3, further comprising:

a back plate connecting the first motor and the second motor; and a strongback connecting the center vacuum portion to the back plate.

5. The pick and place end effector of claim 2, further comprising:

a Z motor configured to move the first vacuum plate and the second vacuum plate in a Z direction independent of a gantry or robotic arm connected to the pick and place end effector.

6. The pick and place end effector of claim 2, wherein the number of restraints comprises a first clamping plate movably connected to the first vacuum plate and mechanical restraints configured to hold the first clamping plate relative to the vacuum lift face.

7. The pick and place end effector of claim 6, wherein the first clamping plate and a second clamping plate each comprise gripping teeth configured to grip the composite laminate.

8. The pick and place end effector of claim 6, wherein the first clamping plate is configured to move between an open configuration and a clamping configuration, wherein the first clamping plate is connected to a first motor when in the open configuration, and wherein the first clamping plate is secured using the mechanical restraints in the clamping configuration.

9. A method of forming a kink into a composite laminate, the method comprising:

lifting a composite laminate on a vacuum lift face of a pick and place end effector, the vacuum lift face comprising a first vacuum plate, a center vacuum portion and a second vacuum plate and holding the composite laminate in a flat configuration to a forming configuration with an angle in the vacuum lift face to form the kink in the composite laminate;

clamping portions of the composite laminate on the vacuum lift face;

forming a bent composite laminate by moving the vacuum lift face between the flat configuration and a forming configuration comprising an angle between the first vacuum plate and the center vacuum portion and a second angle between the second vacuum plate and the center vacuum portion while the portions of the composite laminate are clamped on the vacuum lift face; and placing the bent composite laminate on a mandrel comprising a kink.

10. The method of claim 9, wherein lifting the composite laminate on the vacuum lift face comprises drawing a vacuum through the first vacuum plate and the second vacuum plate of the vacuum lift face.

11. The method of claim 10, wherein clamping portions of the composite laminate on the vacuum lift face comprises clamping a first portion of the composite laminate to the first vacuum plate and a second portion of the composite laminate to the second vacuum plate.

12. The method of claim 11, wherein clamping the first portion of the composite laminate to the first vacuum plate comprises rotating a first clamping plate relative to the first vacuum plate and securing the first clamping plate relative to the first vacuum plate.

13. The method of claim 10, further comprising:

rotating the first vacuum plate and the second vacuum plate away from the composite laminate about a center vacuum portion connected to the first vacuum plate and the second vacuum plate.

14. The method of claim 13, wherein rotating the first vacuum plate away from the composite laminate comprises retracting a first motor connected to the first vacuum plate.

15. The method of claim 9, wherein lifting the composite laminate comprises moving the pick and place end effector using one of a robotic arm or a gantry.

16. The method of claim 9, wherein placing the bent composite laminate on the mandrel comprises adjusting a Z position of the composite laminate using a Z motor of the pick and place end effector.

17. A pick and place end effector configured to form a kink, wherein the pick and place end effector comprises:

a vacuum lift face that comprises: a stationary center vacuum portion, a first vacuum plate movably connected to the stationary center vacuum portion, and a second vacuum plate movably connected to the stationary center vacuum portion;

a number of restraints configured to restrain movement of portions of a composite laminate on opposite sides of the center vacuum portion on the vacuum lift face; and motors configured to move the first vacuum plate and the second vacuum plate relative to the stationary center vacuum portion to place the vacuum lift face in a forming configuration comprising an angle between the first vacuum plate and the center vacuum portion and a second angle between the second vacuum plate and the center vacuum portion.

18. The pick and place end effector of claim 17, wherein the number of restraints comprise:

a first clamping plate configured to clamp a full width of the composite laminate against the first vacuum plate in a clamping configuration; and a second clamping plate configured to clamp a full width of the composite laminate against the second vacuum plate in a clamping configuration.

19. The pick and place end effector of claim 18, wherein the first clamping plate is movably connected to the first vacuum plate by a hinge having an open channel, the open channel configured to set a distance between the first clamping plate and the first vacuum plate.

20. The pick and place end effector of claim 18, wherein the motors comprises a first electronic motor connected to the first clamping plate and a second electronic motor connected to the second clamping plate.

21. The pick and place end effector of claim 18, wherein the first clamping plate and the second clamping plate are formed of a metal.

22. The pick and place end effector of claim 17, wherein vacuum distribution of the vacuum lift face comprises at least one of material of the vacuum lift face, vacuum channels, or vacuum cups.

* * * * *